(12) United States Patent
Vanderheyden et al.

(10) Patent No.: US 7,477,484 B2
(45) Date of Patent: Jan. 13, 2009

(54) TAPE CARTRIDGE WRITE PROTECT MECHANISM

(75) Inventors: William J. Vanderheyden, Loveland, CO (US); Henrik Vladimir Nejezchleb, Boulder, CO (US); David T. Hoge, Westminister, CO (US)

(73) Assignee: Quantum Corporation, San Jose, CA (US)

( * ) Notice: Subject to any disclaimer, the term of this patent is extended or adjusted under 35 U.S.C. 154(b) by 510 days.

(21) Appl. No.: 10/491,864

(22) PCT Filed: Oct. 15, 2001

(86) PCT No.: PCT/US01/31982

§ 371 (c)(1),
(2), (4) Date: Apr. 7, 2004

(87) PCT Pub. No.: WO03/034431

PCT Pub. Date: Apr. 24, 2003

(65) Prior Publication Data

US 2004/0201921 A1  Oct. 14, 2004

(51) Int. Cl.
*G11B 23/02* (2006.01)
(52) U.S. Cl. ...................................... 360/132
(58) Field of Classification Search ................. 360/132
See application file for complete search history.

(56) References Cited

U.S. PATENT DOCUMENTS 4,320,421 A * 3/1982 Larson et al. ................. 360/60
4,320,422 A   3/1982 Rinkleib
4,460,930 A * 7/1984 Takahashi .................... 360/60
4,769,732 A * 9/1988 Tanaka ....................... 242/344

(Continued)

FOREIGN PATENT DOCUMENTS

DE           3344209 A1    6/1984

(Continued)

OTHER PUBLICATIONS

Japanese Office Action mailed Oct. 30, 2007, for Japanese Application No. 2003-537071 filed Oct. 15, 2001, 4 pages. (English translation attached).

*Primary Examiner*—Angel Castro
*Assistant Examiner*—Christopher R. Magee
(74) *Attorney, Agent, or Firm*—Morrison & Foerster LLP

(57) ABSTRACT

The write protect mechanism provides a method for identifying the write protect state of the tape media enclosed in a tape cartridge from at least two orientations. A write protect switch on the front side of the tape cartridge housing moves to block the write protect aperture on the side of the tape cartridge housing when the write protect switch is in the write enable position and away from the aperture in the write protect position. A write protect indicator on the tape cartridge top cover includes a window that allows the user to view the position of the write protect switch by viewing the top of the switch. The top of the switch may include an arrow that moves corresponding to the position of the write protect switch, thus providing a means for the user to determine the write protect state. Human readable icons or color combinations on the write protect switch and/or adjacent to the write protect indicator clearly indicate the write protect state of the tape media enclosed within the tape cartridge.

6 Claims, 2 Drawing Sheets

U.S. PATENT DOCUMENTS

| | | | |
|---|---|---|---|
| 4,844,378 A | | 7/1989 | Oishi |
| 4,860,127 A | * | 8/1989 | Takahashi et al. ............. 360/60 |
| 5,209,429 A | * | 5/1993 | Doolin et al. ............ 244/17.11 |
| 5,210,671 A | * | 5/1993 | Blackston .................... 360/133 |
| 5,239,437 A | * | 8/1993 | Hoge et al. .................. 360/132 |
| 5,371,644 A | * | 12/1994 | Hoge et al. .................. 360/132 |
| 5,504,644 A | * | 4/1996 | Sasaki et al. ................. 360/132 |
| D369,791 S | * | 5/1996 | Wulfing et al. ............. D14/114 |
| 5,699,216 A | * | 12/1997 | Doty .......................... 360/132 |
| 6,034,850 A | | 3/2000 | Del Genio et al. |
| 6,672,527 B2 | * | 1/2004 | Tsuyuki et al. ............. 242/344 |

FOREIGN PATENT DOCUMENTS

| | | |
|---|---|---|
| EP | 0150601 A1 | 8/1985 |
| EP | 0669618 A2 | 8/1995 |
| JP | 62214572 | 9/1987 |
| JP | 5036233 | 2/1993 |
| JP | 5198138 | 8/1993 |
| JP | 7153233 | 6/1995 |
| JP | 7240082 | 9/1995 |
| JP | 09270182 | 10/1997 |
| JP | 9282837 | 10/1997 |
| JP | 11025650 | 1/1999 |
| JP | 11086499 | 3/1999 |
| WO | WO 00/54275 A1 | 9/2000 |

* cited by examiner

TAPE CARTRIDGE WRITE PROTECT MECHANISM

FIELD OF THE INVENTION

The invention relates to digital tape cartridges, and in particular, to a mechanical write protect mechanism that is readable by the tape drive and viewable by the user from two or more surfaces of the tape cartridge and includes human readable icons imprinted on the write protect switch and a write protect indicator.

PROBLEM

It is a problem in the field of magnetic tape cartridges to prevent accidental overwriting or erasing stored data while also providing a method for selecting between write enable and write protect states which states are readable by the tape drive and by the user on one or more tape cartridge surfaces. Existing tape cartridges fail to provide a method for viewing the write-protect status of a tape cartridge from more than one surface of the tape cartridge or to differentiate between the write enable and the write protect state without human readable icons.

Tape cartridges include an opening through which a magnetic head of a tape drive has access to the tape media enclosed in the tape cartridge. An aperture is also provided in the tape cartridge to indicate a write protect state. Write protection devices include a write-sensing device located within the tape drive and a corresponding aperture in the tape cartridge to allow the sensing device to determine the write protect state of the tape cartridge. When the aperture is covered or blocked, the tape cartridge is write enabled. Conversely, when the aperture is open, the tape cartridge is write protected. The user is limited to viewing the aperture in the tape cartridge to determine the write protect state of the tape cartridge. Existing tape cartridges fail to provide a method to prevent a user from placing the tape cartridge in a write enable state when the user intended to place the tape cartridge in the write protect state or to provide an apparatus that allows the user to view the write protect state from more than one tape cartridge orientation.

Removable Write Protection Apparatus

Early tape cartridges provided a removable strip that covered the write protect aperture to prevent writing on the tape media. Once removed, the tape media could not receive additional recorded data. To allow subsequent use of the tape cartridge, user's covered the aperture with adhesive tape or other appropriate means.

A write protect apparatus disclosed by Takahashi (U.S. Pat. No. 4,460,930) provides a removable write protection apparatus that can be slidably remounted to the tape cartridge after being removed. When the removable write protection apparatus is in place, data can be recorded on the enclosed tape media. Once removed, writing is prevented until the write protection apparatus is remounted to the tape cartridge.

Sliding Switch Readable with Cartridge Removed from Tape Drive

Mechanical sliding switches are known for sliding a movable member within the write protect aperture between a write enable and a write protect state by changing the location of movable member. Tape cartridges with write protection issued to Takahashi, (U.S. Pat. No. 4,860,127), Tanaka (U.S. Pat. No. 4,769,732), and Blackston (U.S. Pat. No. 5,210,671) provide a moveable member or tab that slides between an open and closed position within the write protect aperture in the tape cartridge housing. When the sliding member covers the aperture, the write-sensing device can not cross the threshold into the tape cartridge indicating that writing is enabled. On the other hand, when the movable member was slid to uncover the aperture, the write sensing lever penetrates the tape cartridge indicating a write protect state. While the sliding members disclosed in Takahashi and Tanaka are assembled into the write protect aperture during assembly of the tape cartridge housing, the sliding member in Blackston, is inserted into the write protect aperture after the tape cartridge housing has been assembled, thus simplifying the production process.

The user of the tape cartridge write protect mechanisms just described can only view that status of the write protection from one specific orientation after that tape cartridge is removed from the tape drive. When the user views an open aperture, the tape cartridge is write protected. If the movable member or tab covers or blocks the aperture, data can be written on the enclosed tape media. It is difficult for the user to remember the relationship between the positions of the write protect switch or the write protect aperture and the write enable and write protect states. These write protection devices fail to provide an alternative method for identifying the write protect status that may prevent the user from mistakenly placing the tape cartridge in the write enabled state when the user intended to place the tape cartridge in the write protect state.

Human Readable Mark on Slide Mechanism

The self-identifying universal storage element disclosed by Hoge, (U.S. Pat. No. 5,239,437) provides coding apertures on the exterior housing of the tape cartridge. The coding apertures are implemented by inserting a block into a corresponding recess in the front of the tape cartridge housing. One of the coding apertures corresponds to the write protect status of the tape cartridge and is definable by a sliding mechanism to enable the user to set the write protect state of the tape cartridge. A human readable mark is also provided on the slide mechanism to indicate the write protect state of the tape cartridge.

Another human readable write protect mechanism disclosed by Hoge, (U.S. Pat. No. 5,371,644) provides a first portion of a human readable mark on the housing proximate the write protect aperture. The second portion of the human readable mark is integral to the sliding mechanism. When the sliding mechanism is in one position the aperture is blocked and the corresponding first and second portions of the human readable mark are aligned indicating a write enabled state. Conversely, when the write protect aperture is in the open position, the first and second portions of the human readable mark are not aligned depicting a broken image of the symbol, thereby indicating a write protect state.

While the human readable mark overcomes the problem of placing the tape cartridge in the write enabled state when the user indented to place the tape cartridge in the write protect state, it fails to provide a means for viewing the write protect state from more than one surface of the tape cartridge housing.

For these reasons, a need exists for write protect mechanism to easily switch between the write enable and protect states while allowing the user to view the state of the tape cartridge from more than one orientation.

SOLUTION

The present write protect mechanism overcomes the problems outlined above and advances the art by providing a method for identifying the write protect state of the cartridge from at least two orientations with human readable icons. Existing tape cartridges employing write protection require the user to view the write protect aperture to determine the write protect state of the tape cartridge. The present write protect mechanism allows the user to determine the write protect state of the tape cartridge from the top and the front orientations in addition to viewing the write protect aperture.

A write protect switch located on the front exterior housing of the tape cartridge allows the user to select between write enable and write protect. The write protect switch may be a sliding or a rotating switch that moves between the write enable and the write protect state. A write protect aperture located on the side of the tape cartridge housing provides a conventional write protect aperture for the tape drive to determine the write protect state of the tape cartridge when the tape cartridge is inserted into the tape drive. When the write protect switch is moved to the write enable state, the write protect switch blocks the write protect aperture. Conversely, when the write protect switch is moved to the write protect position, the write protect switch clears, or opens, the write protect aperture indicating that the tape cartridge is write protected.

The write protect switch comprises a user selection tab or other apparatus for moving the write protect switch between the write enabled and protected positions and human readable icons on both side of the user selection tab. When the write protect switch is in the write enable position, the exposed icon depicts a writing instrument or other universally acceptable icon to indicate the write enable state. When the write protect switch is in the write protect position, the exposed icon is an identical writing instrument enclosed within a circle with a slash through the circle indicating the write protect state.

In an embodiment, the tape cartridge cover includes a write protect indicator on the tape cartridge cover. The write protect indicator includes a viewing window above the write protect switch to allow the user to view the position of the write protect switch. The write protect mechanism further comprises an arrow on the top surface of the write protect switch perpendicular to the user selection tab. The arrow is viewable through the viewing window in the write protect indicator on the tape cartridge cover. When the user changes the position the write protect switch the arrow moves to a corresponding position. In another embodiment of the write protect mechanism, human readable icons as previously discussed are located above the viewing window such that as the write protect switch is moved between the enable and protect positions, the arrow points to the corresponding human readable icon.

In yet another embodiment of the write protect mechanism, the two areas adjacent to the arrow are color coded to indicate write enable and write protect, such as green on one side of the arrow and red on the other side of the arrow. In this embodiment, when the write protect switch is in the write enable position, the green area adjacent to the arrow is viewable through the viewing window and the arrow points to the write enable icon. Conversely, when the write protect switch is in the write protect position, the red area adjacent to the arrow is viewable through the viewing window and the arrow points to the write protect icon.

Thus, the use of a write protect switch located on the front plane of the tape cartridges perpendicular to the write protect aperture provides the user with two orientations to determine the write protect state of the tape cartridge. The write protect indicator and human readable icons imprinted on the write protect switch allow the user to determine the write protect status of the tape cartridge from a third orientation, the cover of the tape cartridge. The human readable icons provide a method for preventing the user from inadvertently selecting the write enable position when the user intended to select the write protect position.

DETAILED DESCRIPTION

The write protect mechanism summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

The tape cartridge housing comprises a cartridge cover and a cartridge base that are joined together to form the tape cartridge housing that encloses a single reel on which is wound a length of magnetic tape. A write protect aperture in one side of the tape cartridge provides an aperture for the corresponding write protect sensing device or lever located in the tape drive to determine the write protect state of the tape cartridge when the tape cartridge is inserted into the tape drive. Another aperture in the front of the tape cartridge housing includes a door assembly that opens when the tape cartridge is inserted into the tape drive to expose the enclosed tape media for operation. Adjacent to the door assembly on the front of the tape cartridge perpendicular to the write protect aperture is a movable write protect switch.

Figure 1:
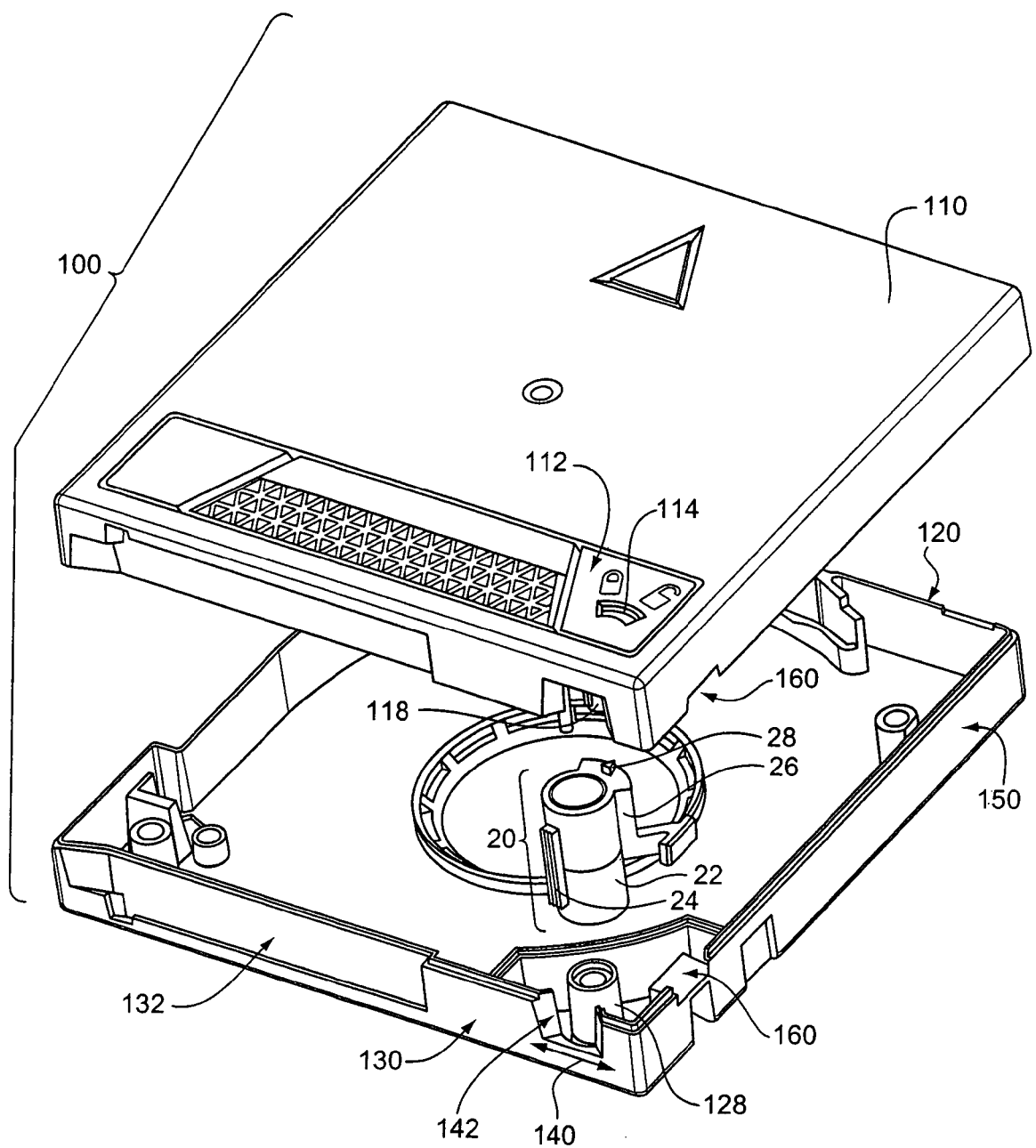
FIG. 1 illustrates a interior prospective view of a tape cartridge with the write protect mechanism with human readable icons.

Movable Write Protect Switch—FIG. 1:

Referring to FIG. 1, the write protect switch 20 comprises a cylinder 22, a user selection tab 24 for rotating cylinder 22, an arm 26, and an arrow 28. Tape cartridge housing cover 110 and tape cartridge base 120 includes mounting members for mounting write protect switch 20 in one corner of the tape cartridge. As illustrated in FIG. 1, top and bottom mounting members 118 and 128 are cylindrical mounting members that have an outside diameter that is less than the inside diameter of write protect switch 20's cylinder 22. Write protect switch 20 provides a user selection tab 24 integrally formed on the lateral surface of cylinder 22 to allow the user to select a write protect state by rotating write protect switch 20.

When tape cartridge cover 110 and base 120 are joined together, a write protect switch opening 140 is formed in the tape cartridge front 130 adjacent to door assembly 132 and perpendicular to the write protect aperture 160. Write protect switch opening 140 includes side walls 142 that limit the travel of write protect switch 20. Cylinder 22 fits over top and bottom mounting members 118 and 128 with user selection tab 24 protruding into write protect switch opening 140 when cover 110 and base 120 are connected. The position of write protect switch 20 is recessed from tape cartridge 100 front surface 130 such that whether in the write enable or write protect position, user selection tab 24 does not protrude from tape cartridge 100 front surface 130. The length of cylinder 22 is slightly less than the distance between the tape cartridge cover 110 and base 120 to allow write protect switch 20 to rotate while securely holding write protect switch 20 in place.

When tape cartridge cover 110 and base 120 are joined together, a write protect aperture 160 is formed in the corner of the tape cartridge side 150 perpendicular to write protect switch opening 140. As previously described, when tape cartridge 100 is inserted into the tape drive, a write protect sensing device, or lever, within the tap drive determines the write protect state of the tape cartridge. When write protect aperture 160 is open, tape cartridge 100 is in the write protect state and when write protect aperture 160 is blocked, or closed, tape cartridge 100 is in the write enable state. Write protect switch 20 also blocks or covers write protect aperture 160 corresponding to the position of write protect switch 20.

As illustrated in FIG. 1, arm 26 is integrally connected to write protect switch 20 and includes a flat surface 28 integrally formed at the end of arm 26. As write protect switch 20 is rotated between a write enable and a write protect position, arm 26 rotates a corresponding distance in the same direction. When write protect switch 20 is in the write enable position, flat surface 28 of arm 26 covers write protect aperture 160. Thus, the tape drive write protect sensing device or lever is unable to cross the threshold into tape cartridge 100 indicating that tape cartridge 100 is in the write enable state. When write protect switch 20 is rotated to the write protect position, arm 26 rotates away to uncover write protect aperture 160, thus indicating that tape cartridge 100 is in the write protect state.

While the write protect switch is illustrated and discussed comprising a rotating cylinder including an arm that blocks the write protect aperture, in another embodiment (not illustrated) write protect switch is a sliding switch. When the sliding switch is slid to the write enable position, a member integrally connected to the sliding switch covers the write protect aperture in the side of the tape cartridge. Likewise, when the sliding switch is slid to the write protect position, the write protect aperture is uncovered, indicating that the tape cartridge is in the write protect state.

Neither the rotating write protect switch embodiment nor the sliding write protect switch embodiment change the shape or size of the tape cartridge housing. The present write protect mechanism does not change the size and shape of the tape cartridge housing. By maintaining the shape and size, tape cartridges having the present write protect mechanism are compatible with existing equipment such as automated tape cartridge libraries, loaders or other transport devices that use the exterior shape and edges of the tape cartridge for gripping, holding and moving the tape cartridge.

The tape cartridge housing illustrated and described comprises a cover 110 and a base 120 that are molded with one half of the side walls integrally formed to cover 110 and to base 120. When cover 110 and base 120 are connected, the tape cartridge front, back and sides are formed. While front, back, and sides are illustrated and described as being formed by the cover and the base, they could be integrally formed into the cover or the base. Similarly, write protect switch opening 140 and write protect aperture 160 have been described as being formed when the tape cartridge cover 110 and base 120 are connected, the write protect switch opening 140 and write protect aperture 160 could be molded into either tape cartridge cover 110 or base 120.

Write Protect Indicator—FIG. 1:

Tape cartridge 100 includes a write protect indicator 112 located on the top surface of tape cartridge cover 110. Write protect indicator 112 comprises a window 114 located directly above write protect switch 20 cylinder 22. An arrow 28 located on the top surface of cylinder 22 perpendicular to user selection tab 24 is viewable through window 114. As write protect switch 20 rotates, arm 26 and arrow 28 rotate correspondingly. When write protect switch 20 is in the write enable position, arm 26 rotates toward write protect aperture 160 and arrow 28 rotates to one end of window 114. Conversely, as write protect switch 20 is rotated to the write protect position, arm 26 uncovers write protect aperture 160 and arrow 28 rotates to the opposite end of write protect indicator 112 window 114.

Unlike existing tape cartridges, the present write protect mechanism provides a write protect indicator 112 to allow the user to view the write protect state of tape cartridge 100 from the top surface. To prevent the user from placing the tape cartridge in the wrong state, human readable icons are used to clearly differentiate the write enable state from the write protect state.

Figure 2:
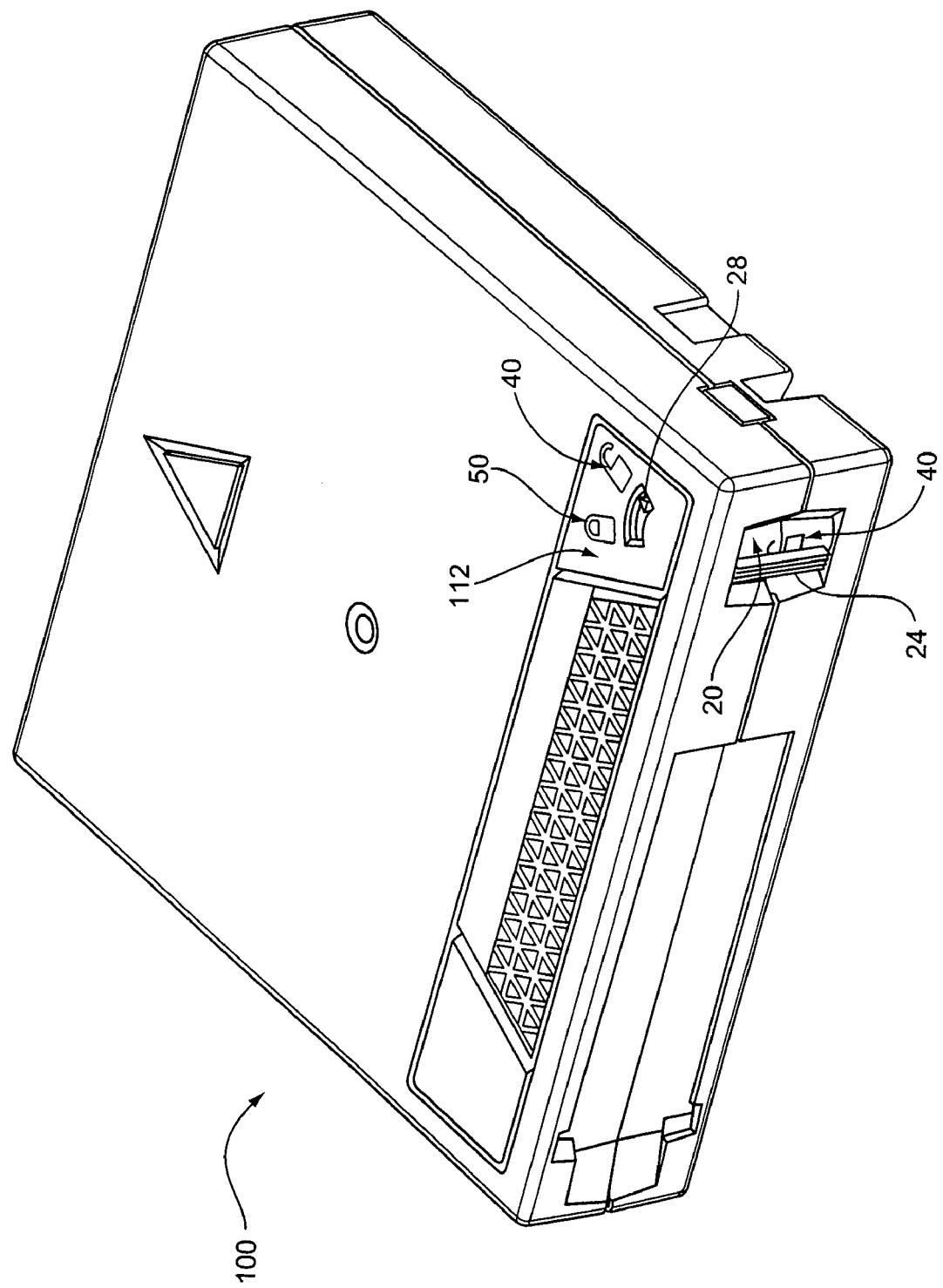
FIG. 2 illustrates an exterior prospective view of the write protect mechanism with human readable icons.

Human Readable Icons—FIG. 2:

It is difficult for the user to remember the relationship between the position of the write protect switch or the write protect aperture and the write enable and write protect states. Thus, a user may mistakenly place the write protect switch in the write enable position when the user intended to place the write protect switch in the write protect position. To solve the problem, write protect switch 20 and write protect indicator 112 just described includes a means for readily identifying the write protect state of tape cartridge 100.

Referring to FIG. 2, human readable icons are molded onto write protect switch 20 which clearly denotes the write protect state of write protect switch 20. A write enable icon 40 and a write protect icon 50 may be molded onto write protect switch 20 cylinder 22 such that write enable icon 40 is located on one side of user selection tab 24 and write protect icon 50 is molded onto the opposite side of user selection tab 24. Write enable icon 40 may depict a pencil or other writing instrument or a padlock in the open position (as illustrated). Write protect icon 50 may depict the same icon as write enable icon 40 enclosed in a circle with a slash through the circle or as a padlock in the closed position. The pencil or other writing instrument enclosed by a circle with a slash through the circle indicate that the tape cartridge is in the write protect state.

In an alternative embodiment, the area of write protect switch 20 on either side of user selection tab 24 and arrow 28 can be color coded to indicate the write protect state of the tape cartridge. For example, the areas adjacent to user selection tab 24 and arrow 28 that are visible when write protect switch 20 is in the write enable position may be color coded green as a connotation that tape cartridge 100 is in the write enable state. Conversely, the opposite side of user selection tab 24 and arrow 28 may be color coded red indicating a write protect state. While the human readable icons have been described utilizing writing instruments or green and red color combination, other icons or color combinations are possible.

The present write protect mechanism provides a means for viewing the write protect state of the tape cartridge from at least two orientations with human readable icons. The write protect switch and indicator provide a means to protect against inadvertently selecting the write enable position when the user intended to select the write protect position. As to alternative embodiments, those skilled in the art will appreciate that the present write protect mechanism with human readable icons may be configured with variations in the write protect switch, write protect indicator and/or human readable icons.

It is apparent that there has been described, write protect mechanism for a magnetic tape cartridge, that fully satisfies the objects, aims, and advantages set forth above. While the write protect mechanism has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A tape cartridge write protect mechanism for a user to select a write protect state of the tape media enclosed in the tape cartridge, the tape cartridge having a housing comprising a cover, a base, and a write protect aperture formed in a first side of the tape cartridge hausing, the mechanism comprising:
   an opening in a second side of the tape cartridge housing perpendicular to the write protect aperture, the opening having sides that extend partially into the tape cartridge housing;
   a movable member for selecting between a write enabled position and a write protect position by the user, wherein the movable member is movable by the user through the opening and located on the interior of the tape cartridge housing such that a top end is located proximal to the tape cartridge cover;
   a blocking element for the write protect aperture, wherein the blocking element is integrally connected to the movable member, wherein the blocking element correspondingly moves to block the write protect aperture in response to the movable member being moved to the write enable position; and
   at least two human readable icons integrally formed on the movable member, one of the at least two human readable icons denoting a write enable state and the other one of the at least two human readable icons denoting a write protect state, wherein the one of the at least two human readable icons is viewable by the user corresponding to the movable member being moved to one of the write enable position or the write protect position, wherein each of the at least two human readable icons is a different color.

2. The write protect mechanism of claim 1, wherein the movable member further comprises:
   a write protect switch; and
   a tab extending perpendicular from the write project switch, wherein the tab extends into the opening to allow the user to move the write protect switch between the write enable position and the write protect position and one of the at least two human readable icons is located on the side of the tab corresponding to the write enable position and a second one of the at least two human readable icons is located on the opposite side of the tab corresponding to the write protect position.

3. The write protect mechanism of claim 1, wherein the at least two human readable icons further comprise:
   at least one write enable icon to denote the write enable position and
   at least one write protect icon that, depicts the write enable icon enclosed in a circle having a slash through the circle to denote the write protect position.

4. The write protect mechanism of claim 1, further comprising:
   an indicator having a window, wherein the window is located on the cover of the tape cartridge housing directly above the movable member; and
   an indicating symbol, disposed on the top end of the movable member that is viewable through the window for indicating the movable member as being in one of the write enable or the write protect position; and
   at least two human readable icons integral to the tape cartridge housing cover adjacent to the window, wherein one of the at least two human readable icons denotes the write enable state and the other one of the at least two human readable icons denotes the write protect state and the indicating symbol indicates the corresponding one of the at least two human readable icons in response to the movable member being moved to one of the write enable position or the write protect position.

5. A tape cartridge write protect mechanism to select a write protect state of the tape media enclosed in the tape cartridge, the tape cartridge having a housing comprising a cover and write protect aperture formed in a first side of the tape cartridge housing, the mechanism comprising:
   an opening in the tape cartridge housing perpendicular to the write protect aperture, the opening having sides that extend partially into the tape cartridge housing;
   a switch having a tab perpendicular to the switch surface and a top end having an indicating symbol molded thereon perpendicular to the tab, wherein the switch is located on the interior of the tape cartridge housing and the tab extends into and is movable through the opening to move the switch between a write enable position and a write protect position;
   a blocking element for the write protect aperture, the blocking element integrally connected to the switch such that in response to the switch being moved to one of the write enable position, the blocking element correspondingly moves to block the write protect aperture;
   an indicator having a window, the indicator located on the cover of the tape cartridge housing directly above the switch, wherein the indicating symbol is viewable through the window;
   two write enable icons, one of the two write enable icons located on one side of the tab and the other one of the two write enable icons located on one side of the window; and
   two write protect icons, one of the two write protect icons located on the opposite side of the tab and the other one of the two write protect icons located on the opposite side of the window, wherein in response to the switch being in one of the write enable position or the write protect position, the corresponding one of the two write enable icons or the two write protect icons located on the switch is visible and the indicating symbol indicates the corresponding other one of the two write enable icons or the two write protect icons.

6. A tape cartridge write protect mechanism for a user to select a write protect state of the tape media enclosed in the tape cartridge, the tape cartridge having a housing comprising a cover, a base and a write protect aperture formed in a first side of the tape cartridge housing, the mechanism comprising:
   an opening in the tape cartridge housing perpendicular to the write protect aperture, the opening having sides the extend partially into the tape cartridge housing;
   a switch for selecting the write protect state of the tape cartridge, the switch having a surface between a top end and a bottom end, the switch comprising:
   a tab extending perpendicular from the surface, wherein the switch is located in the tape cartridge housing with the tab extending into the opening to allow the user to move the switch between a write enable position and a write protect position;
   an indicator symbol integrally formed on the top end of the switch;

an arm for blocking the write protect aperture, the arm integrally connected to the switch such that in response to the switch being moved to the write enable position the arm blocks the write protect aperture; and two human readable icons, wherein each of the two human readable icons is integrally formed on opposite sides of the tab, wherein one of the two human readable icons denotes a write enable state and the other one of the two human readable icons denotes a write protect state; and an indicator comprising:

a window located on the tape cartridge housing cover directly above the switch; and two human readable icons molded onto tape cartridge cover adjacent to the window, wherein one of the two human readable icons denotes the write enable position and the other one of the two human readable icons denotes the write protect position, wherein the indicating symbol indicates the corresponding one of the two human readable icons in response to the switch being moved to one of the write enable position or the write protect position.

* * * * *